United States Patent [19]

Plach et al.

[11] Patent Number: 5,753,142

[45] Date of Patent: May 19, 1998

[54] NEMATIC LIQUID-CRYSTAL COMPOSITION FOR ACTIVE MATRIX APPLICATION

[75] Inventors: Herbert Plach, Darmstadt; Ekkehard Bartmann, Erzhausen; Eike Poetsch, Mühltal, all of Germany; Syuichi Kozaki, Nara, Japan; Kazuyoshi Fujioka, Kashihawa, Japan; Masako Nakamura, Yamatokooriyama, Japan; Hiroshi Numata, Yokohama, Japan; Hideo Ichinose, Odawara, Japan

[73] Assignees: Merck Patent Gesellschaft Mit Beschrankter Haftung, Darmstadt, Germany; Sharp Corporation, Osaka, Japan

[21] Appl. No.: 776,503

[22] PCT Filed: Feb. 17, 1996

[86] PCT No.: PCT/EP96/04787

§ 371 Date: Jan. 27, 1997

§ 102(e) Date: Jan. 27, 1997

[87] PCT Pub. No.: WO96/41847

PCT Pub. Date: Dec. 27, 1996

[30] Foreign Application Priority Data

Mar. 2, 1995 [EP] European Pat. Off. ............. 95102955

[51] Int. Cl.$^6$ ............................ C09K 19/30; C09K 19/12
[52] U.S. Cl. .................................. 252/299.6; 252/299.66
[58] Field of Search .................... 252/299.63, 299.66, 252/299.01

[56] References Cited

U.S. PATENT DOCUMENTS

| | | | |
|---|---|---|---|
| 5,279,763 | 1/1994 | Sasaki et al. | 252/299.63 |
| 5,431,850 | 7/1995 | Nakamura et al. | 252/299.63 |
| 5,520,846 | 5/1996 | Plach et al. | 252/299.63 |
| 5,565,140 | 10/1996 | Hittich et al. | 252/299.63 |
| 5,578,241 | 11/1996 | Plach et al. | 252/299.01 |
| 5,645,759 | 7/1997 | Tomi et al. | 252/299.63 |

*Primary Examiner*—C. H. Kelly
*Attorney, Agent, or Firm*—Millen, White, Zelano & Branigan, P.C.

[57] ABSTRACT

A nematic liquid-crystal composition for active matrix displays with high voltage holding ratio, an optical birefringence an in the range from 0.12 to 0.13 and a low threshold voltage.

1 Claim, No Drawings

NEMATIC LIQUID-CRYSTAL COMPOSITION FOR ACTIVE MATRIX APPLICATION

This application is a 371 of PCT EP96/04787.

The invention relates to a nematic liquid-crystal composition based on terminally and laterally fluorinated compounds. This composition is especially useful for active matrix application.

Active matrix displays (AMD) are highly favored for commercially interesting displays with a high information content. Such AMDs are used for TV application and also for displays with high information content for computer terminals, automobiles and aeroplanes.

AMDs have non-linear electrical switching elements which are integrated at each picture element. As non-linear driving elements thin film transistors (TFT) [Okubo, U., et al., 1982, SID 82 Digest, pp. 40–41] or diodes (e.g.: metal insulator metal: MIM) (Niwa, K., et al., 1984, SID 84, Digest, pp. 304–307] can be applied. These non-linear driving elements allow to use an electro-optical effect with a rather flat electro-optical characteristic if a good viewing angle characteristic can be obtained. So a TN-type cell [Schadt, M. and Helfrich, W., 1971, Appl. Phys. Lett., 18, 127] with a twist angle of 90° can be used. For these applications some physical properties of the liquid crystal become more important than for passive TN displays. Some of the decisive properties for the performance of an AMD are resistivity and stability of the liquid crystal [Togashi, S., Sekiguchi, K., Tanabe, H., Yamamoto, E., Sorimachi, K., Kajima, E., Watanabe, H., Shimuzu, H., Proc. Eurodisplay 84, Sept. 1984: A 210–288 Matrix LCD Controlled by Double Stage Diode Rings, p. 144 ff, Paris; Stromer, M., Proc. Eurodisplay 84, Sept. 1984: Design of Thin Film Transistors for Matrix Addressing of Television Liquid Crystal Displays, p. 145 ff, Paris].

In an AMD the non-linear switching elements are addressed in a multiplex scheme. So they charge the electrodes of a pixel in the limited time they are active. Then they become inactive until they are addressed again in the next cycle. Consequently the change of the voltage on an activated (charged) pixel is a nondesired but a very decisive feature of such a display. The discharge of a pixel is determined by two factors. They are the capacity of the electrodes of the pixel and resistivity of the dielectric material between the electrodes, namely the liquid crystal. The characteristic time constant of the decay of the voltage at a pixel (RC-time) has to be significantly bigger than the time between two addressing cycles (tadr.). A parameter frequently used to describe the performance of an AMD is the voltage holding ratio HR of a picture element:

$$HR = \frac{V(t_0) + V(t_0 + t_{adr.})}{2V(t_0)}$$

As the voltage at a pixel decays exponentially an increase of the holding ratio necessitates liquid crystal materials with exceptionally high resistivities.

There are several points of importance for the resistivity of the liquid crystal inside a display, e.g. orientation layers, curing condition of the orientation material. But by no means less important are the electrical properties of the liquid crystal used. Especially the resistivity of the liquid crystal in the display determines the magnitude of the voltage drop at the pixel.

Similar compositions are disclosed in the following references WO-A-9202597, WO-A-9116399, WO-A-9116400, WO-A-9116397, WO-A-9115555, WO-A-9116398, WO-A-9103450 and WO-A-9302153. Most of the known compositions are, however, used in the so-called first minimum of transmission and consequently have relatively low values for the optical birefringence.

For projection panels higher values for optical birefringence are requested and there is thus still a great need for liquid-crystal composition having an optical birefringence Δn in the range from 0.12 to 0.13, a high resistivity and other suitable material properties for use in AMDs such as a low threshold voltage, a broad nematic mesophase range with an extremely low transition temperature smectic-nematic and no crystallization at low temperatures.

The invention has for its object to provide a liquid-crystal composition with a very high resistivity which meets also the other demands.

It has been found that a nematic liquid-crystal composition having an optical birefringence Δn in the range from 0.12 to 0.13 and essentially consisting of compounds from the following groups 1 to 5:

group 1:

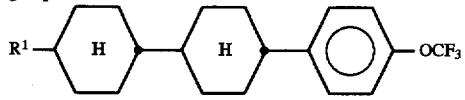

group 2:

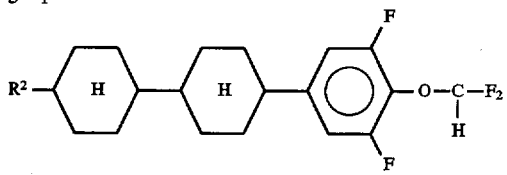

group 3:

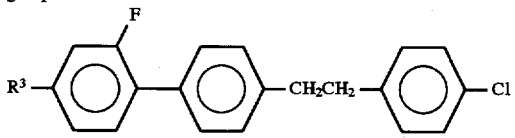

group 4:

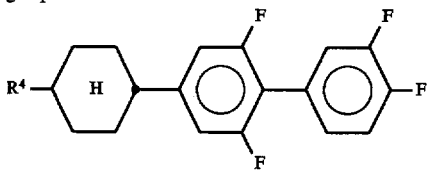

group 5:

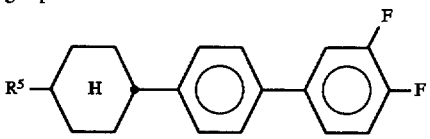

wherein all residues $R^1$ to $R^5$ are straight-chained alkyl groups having 2 to 5 carbon atoms for $R^1$ and $R^3$, 3 to 5 carbon atoms for $R^2$ and $R^4$ and 2, 3 or 5 carbon atoms for $R^5$, characterized in that the composition contains 15 to 20% by weight of four compounds from group 1, 23 to 27% by weight of two compounds from group 2, 18 to 22% by weight of three compounds from group 3, 12 to 15% by weight of two compounds from group 4 and 15 to 20% by weight of three compounds from group 5 and further characterized in that the composition shows a threshold voltage $V_{10}$ of less than 1.6 Volts measured in a twisted nematic cell having a layer thickness of the liquid-crystal composition d=Δn/0.55 μm, is highly suited for use in projection panels. Very high RC time values can be obtained in AMDs. These compositions also show a reduced viscosity and/or do not exhibit any crystallization at –30° C.

The compounds from groups 1 to 5 are known from the European Patent Applns. 0 387 032 and 0 280 902, the European Patents 0 051 738 and 0 125 653, the International Patent Applications WO 89/02884 and WO 90/08757 and U.S. Pat. Nos. 4,302,352, 4,710,315 and 4,419,264 or can be prepared in analogy to known compounds.

Preferred compositions also comprise one or more compounds from group 0 having two rings:

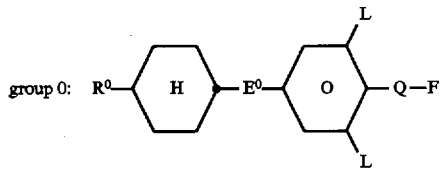

where $R^0$ denotes a straight-chain alkyl group of 2 to 7 carbon atoms, $E^0$ is $-(CH_2)_4-$, $-(CH_2)_2-$, $-CO-O-$ or a single bond. Preferably $E^0$ is $-(CH_2)_2$ or a single bond, Q is a single bond and one of L is H and the other L is H or F.

The preparation of the compositions according to the invention is effected in the conventional manner. In general, the desired amount of the components which is used in the smaller amount is dissolved in the components which constitutes the main constituent, preferably at elevated temperature. If this temperature is chosen to be above the clearing point of the main constituent, the completeness of the process of dissolving can be observed particularly easily.

However, it is also possible to mix solutions of the components in a suitable organic solvent, for example acetone, chloroform or methanol, and to remove the solvent after thorough mixing, for example by distillation under reduced pressure. It is self-evident that with this method it must be ensured that the solvent does not introduce any contaminants or undesirable dopants.

By means of suitable additives the liquid crystal phases according to the invention can be modified in such a way that they can be used in any hitherto disclosed kind of AMD.

The example below serves to illustrate the invention without limiting it. In the example, the melting point and clear point of a liquid crystal substance are given in degrees Celsius. The percentages are by weight.

EXAMPLE

A liquid-crystal composition consisting of

4% of trans-1-p-fluorophenyl-4-n-heptylcyclohexane,

4% of p-[trans-4-(trans-4-ethylcyclohexyl)-cyclohexyl]-trifluoromethoxybenzene

4% of p-[trans-4-(trans-4-propylcyclohexyl)-cyclohexyl]-trifluoromethoxybenzene

4% of p-[trans-4-(trans-4-n-butylcyclohexyl)-cyclohexyl]-trifluoromethoxybenzene 5% of p-[trans-4-(trans-4-n-pentylcyclohexyl)-cyclohexyl]-trifluoromethoxybenzene 8% of 4'-(trans-4-ethylcyclohexyl)-3,4-difluorobiphenyl, 5% of 4'-(trans-4-n-propylcyclohexyl)-3,4-difluorobiphenyl, 5% of 4'-(trans-4-n-pentylcyclohexyl)-3,4-difluorobiphenyl, 7% of 4'-(trans-4-n-propylcyclohexyl)-3,4,2',6'-tetrafluorobiphenyl, 7% of 4'-(trans-4-n-pentylcyclohexyl)-3,4,2',6'-tetrafluorobiphenyl, 6% of 1-(p-chlorophenyl)-2-(2-fluoro-4-ethylbiphenyl-4'-yl)-ethane, 4% of 1-(p-chlorophenyl)-2-(2-fluoro-4-n-propylbiphenyl-4'-yl)-ethane, 9% of 1-(p-chlorophenyl)-2-(2-fluoro-4-n-pentylbiphenyl-4'-yl)-ethane, 12% of 4-[trans-4-(trans-4-n-propylcyclohexyl)-cyclohexyl]-2,6-difluorodifluoromethoxybenzene, 13% of 4-[trans-4-(trans-4-n-pentylcyclohexyl)-cyclohexyl]-2,6-difluorodifluoromethoxybenzene and 3% of 4,4'-Bis-(trans-4-propylcyclohexyl)-2-fluorobiphenyl is prepared. Physical parameters are as follows:
Clearing point: 85° C.
S→N: <-40° C.
Viscosity: 28 mm $S^{-1}$ at 20° C.
$\Delta n$: 0.1238
$\Delta \epsilon$: +8.4
$V_{(10.0.20)}$: 1.57 V
$V_{(50.0.20)}$: 2.38 V

We claim:

1. A nematic liquid-crystal composition having an optical birefringence $\Delta n$ in the range from 0.12 to 0.13 and essentially consisting of compounds from the following groups 1 to 5:

group 1:

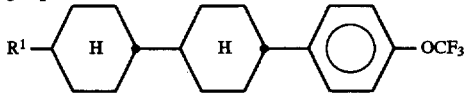

group 2:

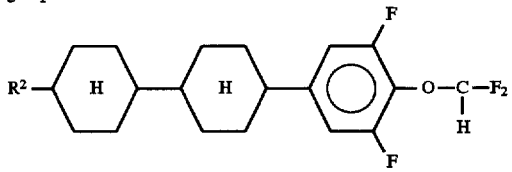

group 3:

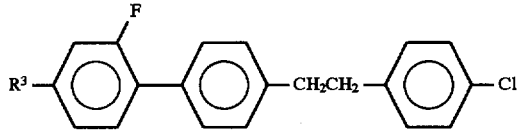

group 4:

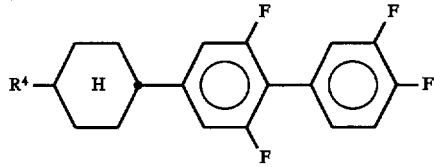

group 5:

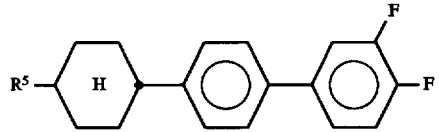

wherein all residues $R^1$ to $R^5$ are straight-chained alkyl groups having 2 to 5 carbon atoms for $R^1$ and $R^3$, 3 to 5 carbon atoms for $R^2$ and $R^4$ and 2, 3 or 5 carbon atoms for $R^5$, characterized in that the composition contains 15 to 20% by weight of four compounds from group 1, 23 to 27% by weight of two compounds from group 2, 18 to 22% by weight of three compounds from group 3, 12 to 15% by weight of two compounds from group 4 and 15 to 20% by weight of three compounds from group 5 and further characterized in that the composition shows a threshold voltage $V_{10}$ of less than 1.6 Volts measured in a twisted nematic cell having a layer thickness of the liquid-crystal composition $d = \Delta n / 0.55$ μm.

* * * * *